(12) United States Patent
Holm et al.

(10) Patent No.: US 11,271,453 B2
(45) Date of Patent: Mar. 8, 2022

(54) IN-PIPE TURBINE GENERATOR ASSEMBLY HAVING A STATOR COMPRISING DIFFERENT LENGTH STATOR SEGMENTS

(71) Applicant: AQUA ROBUR TECHNOLOGIES AB, Gothenburg (SE)

(72) Inventors: Martin Holm, Gothenburg (SE); Niklas Wicén, Gothenburg (SE)

(73) Assignee: AQUA ROBUR TECHNOLOGIES AB, Gothenburg (SE)

(*) Notice: Subject to any disclaimer, the term of this patent is extended or adjusted under 35 U.S.C. 154(b) by 0 days.

(21) Appl. No.: 16/647,965

(22) PCT Filed: Aug. 23, 2018

(86) PCT No.: PCT/SE2018/050850
§ 371 (c)(1),
(2) Date: Mar. 17, 2020

(87) PCT Pub. No.: WO2019/070177
PCT Pub. Date: Apr. 11, 2019

(65) Prior Publication Data
US 2020/0235639 A1    Jul. 23, 2020

(30) Foreign Application Priority Data
Oct. 4, 2017 (SE) .................................... 1751227-8

(51) Int. Cl.
*F03B 13/10* (2006.01)
*H02K 1/12* (2006.01)
(Continued)

(52) U.S. Cl.
CPC ......... *H02K 7/1823* (2013.01); *F03B 17/061* (2013.01); *F03B 13/10* (2013.01);
(Continued)

(58) Field of Classification Search
CPC ........ F03B 13/00; F03B 13/10; F03B 17/061; F05B 2220/20; F05B 2220/602;
(Continued)

(56) References Cited

U.S. PATENT DOCUMENTS

| 2,436,683 A * | 2/1948 | Wood, Jr. ............... | H02K 5/128 |
| | | | 290/52 |
| 9,583,993 B1 * | 2/2017 | Kaiser .................... | H02K 7/088 |

(Continued)

*Primary Examiner* — Tulsidas C Patel
*Assistant Examiner* — S. Mikailoff
(74) *Attorney, Agent, or Firm* — Duane Morris, LLP; Gregory M. Lefkowitz; Joshua R. Javitz (57) ABSTRACT

A turbine generator assembly for generating power from a fluid flow, the assembly comprising: a housing for directing fluid flow, a turbine generator having a longitudinal axis of extension, enclosed in said housing, said turbine generator comprising: a plurality of blades provided on a central rotational axis being parallel with the longitudinal axis, a rotor, and a stator arranged peripherally and annular to the rotor; at least one of the plurality of blades being provided in fixed arrangement with the rotor, and wherein the stator of the turbine generator comprises a plurality of segments each having a coil length parallel to the longitudinal axis of the turbine, and a radial coil thickness, wherein at least two stator segments have different coil lengths and/or thickness to each other.

8 Claims, 5 Drawing Sheets

(51) Int. Cl.
 *H02K 7/18* (2006.01)
 *F03B 17/06* (2006.01)
(52) U.S. Cl.
 CPC ..... *F05B 2220/20* (2013.01); *F05B 2220/602* (2013.01); *F05B 2220/7068* (2013.01); *H02K 1/12* (2013.01)
(58) Field of Classification Search
 CPC ........ F05B 2220/706; F05B 2220/7068; F05B 2250/82; G01F 1/10; H02K 1/12; H02K 3/04; H02K 3/47; H02K 7/1823; Y02B 10/50; Y02E 10/20
 USPC .............................................. 290/43, 52, 54
 See application file for complete search history.

(56) References Cited

U.S. PATENT DOCUMENTS

| | | | |
|---|---|---|---|
| 9,752,550 | B2* | 9/2017 | Bhende ................. F03B 13/086 |
| 10,443,561 | B1* | 10/2019 | Yang ....................... F03B 3/128 |
| 2001/0024075 | A1 | 9/2001 | Caamano |
| 2004/0041491 | A1* | 3/2004 | Gorohata ........... H02K 15/0428 |
| | | | 310/187 |
| 2008/0088135 | A1* | 4/2008 | Novo Vidal ........... H02K 7/183 |
| | | | 290/54 |
| 2009/0315427 | A1 | 12/2009 | Seo |
| 2011/0006523 | A1* | 1/2011 | Samuel .................. F01K 15/02 |
| | | | 290/7 |
| 2011/0042957 | A1 | 2/2011 | Drews |
| 2011/0266911 | A1 | 11/2011 | Booth |
| 2011/0291413 | A1 | 12/2011 | Wamble, III et al. |
| 2012/0086203 | A1* | 4/2012 | Agtuca ................... H02K 1/20 |
| | | | 290/43 |
| 2016/0348638 | A1 | 12/2016 | Chauvin et al. |
| 2020/0235639 | A1* | 7/2020 | Holm .................. H02K 7/1823 |

* cited by examiner

IN-PIPE TURBINE GENERATOR ASSEMBLY HAVING A STATOR COMPRISING DIFFERENT LENGTH STATOR SEGMENTS

FIELD OF THE INVENTION

The present disclosure relates to a turbine generator assembly for generating power from a fluid flow. Specifically the disclosure relates to a turbine having a housing, and a turbine generator provided with a segmented stator.

BACKGROUND OF THE INVENTION

Turbine generators are used to generate electrical energy from mechanical energy. A hydro or water turbine generator converts the energy from a moving flow of water in to electrical energy. For example, a hydroelectric turbine may be positioned downstream from a large dam in a river. Such hydroelectric power generation is normally used to provide energy for communities, such as fed in to a communal power grid. The purpose of such systems is to use as much energy as possible from the flow of water and convert it to electrical energy.

However, smaller hydroelectrical power generation systems may instead be used to provide power to systems which are otherwise difficult to provide with reliable power. For example, measuring of flow velocity, water quality etc. of the water present in communal water systems requires installing devices within pipes deep under the ground in cities or towns. Providing power to such devices requires expensive rerouting of mains electrical cables or the like. Batteries may also be used to power such systems but batteries have a finite lifetime and thus would need to be replaced which leads to increased costs.

A renewable power source provided in the vicinity of the sensor systems themselves would thus be ideal. The size and geometry of such a hydroelectric turbine generator is heavily constrained by the application area. Such existing pipes have only a limited flow, therein only limited energy can be generated from the flow. Techniques and designs for increasing the energy available within the available geometry are thus necessary. Furthermore, the flow should not be significantly disrupted by the turbine generator as this would disrupt the water system.

SUMMARY OF THE INVENTION

Accordingly, the present turbine generator assembly preferably seeks to mitigate, alleviate or eliminate one or more of the above-identified deficiencies in the art and disadvantages singly or in any combination and solves at least the above mentioned problems by providing a turbine generator assembly for generating power from a fluid flow, the assembly comprising: a housing for directing fluid flow, a turbine generator having a longitudinal axis of extension, enclosed in said housing, said turbine generator comprising: a plurality of blades provided on a central rotational axis being parallel with the longitudinal axis, a rotor, and a stator arranged peripherally and annular to the rotor; at least one of the plurality of blades being provided in fixed arrangement with the rotor, and wherein the stator of the turbine generator comprises a plurality of segments each having a coil length parallel to the longitudinal axis of the turbine, and a radial coil thickness, wherein at least two stator segments have different coil lengths and/or thickness to each other. The available energy generated by the turbine is thus increased relative to a traditional stator design.

A pipe section comprising a turbine generator assembly is provided.

A stator comprising a plurality of segments is also provided.

Further advantageous embodiments are disclosed in the appended and dependent patent claims.

BRIEF DESCRIPTION OF THE DRAWINGS

These and other aspects, features and advantages of which the turbine generator assembly is capable will be apparent and elucidated from the following description of embodiments of the present invention, reference being made to the accompanying drawings, in which.

DETAILED DESCRIPTION

Figure 1A:
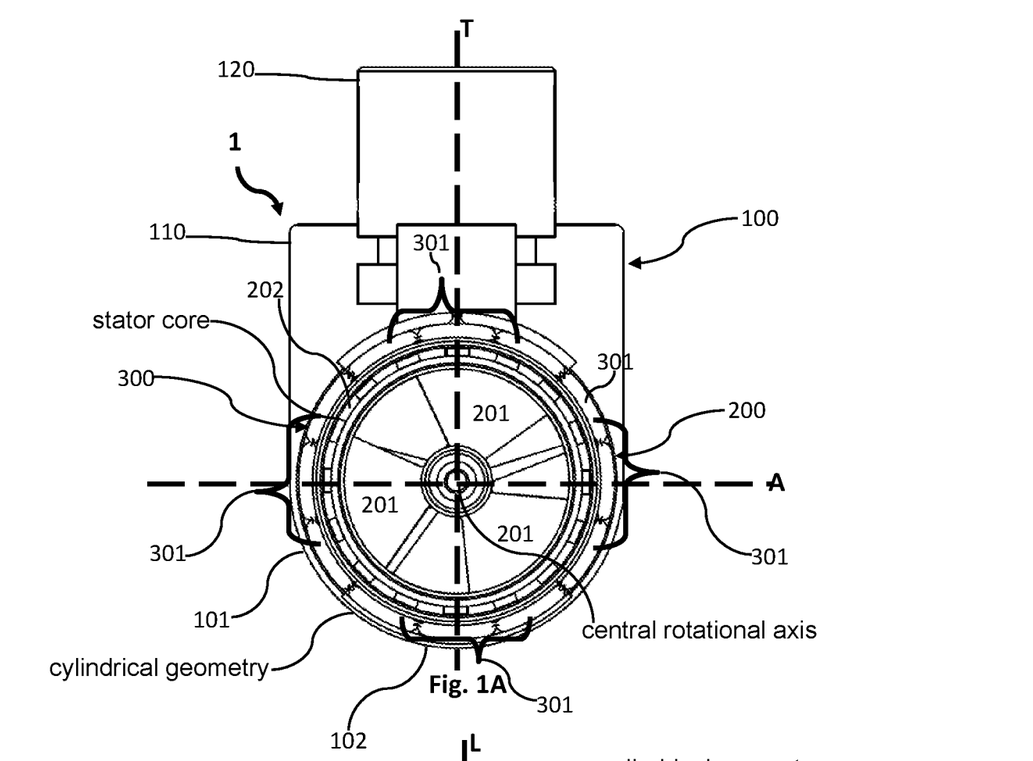
FIG. 1A is a cross-section perspective view of a turbine generator assembly according to an aspect.
Figure 1B:
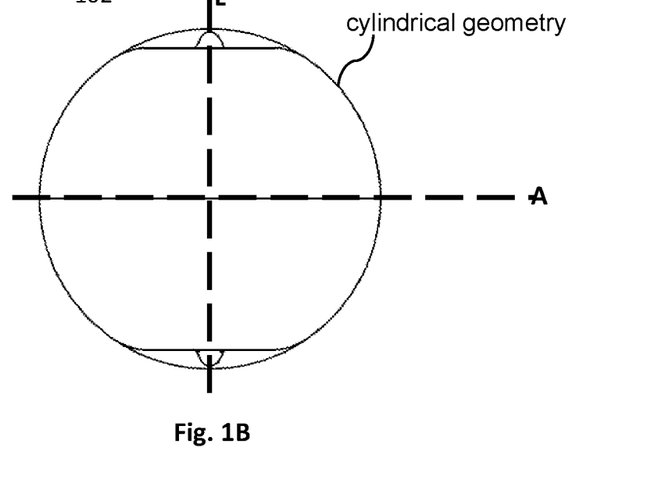
FIG. 1B is a bottom view, along the transverse axis, of a turbine generator assembly according to an aspect.

FIG. 1 shows a turbine generator assembly 1 for generating power from a fluid flow comprising a housing 100 for directing fluid flow, a turbine generator 200 comprising a plurality of blades 201, at least one of the blades 201 in fixed arrangement with an annular rotor 202, and a stator 300. The stator 300 comprises a plurality of segments 301 wherein at least two of the stator segments 301 of the stator 300 have coils of different lengths and/or thicknesses.

The housing 100, turbine assembly 1, and turbine generator 200 have a longitudinal axis L, a transversal axis T, and a lateral axis A. The longitudinal axis L, and therein length of the housing 100, turbine assembly 1, and turbine generator 200, is aligned with the direction of fluid flow. The lateral axis A and the transverse axis T of the housing 100, turbine assembly 1, and turbine generator 200, is shown in FIG. 1A (the longitudinal axis L is in to the page). The longitudinal L and lateral A axes are shown in FIG. 1B (the transverse axis T is in to the page).

The housing 100 has an outer wall 101 which defines its external geometry. A bottom portion 102 of the housing 100 has an external substantially cylindrical geometry along the longitudinal axis L of the housing. The external cylindrical geometry of the bottom portion 102 is defined by the outer wall 101 of the housing 100. The cylindrical geometry improves fluid flow past the turbine assembly 1.

The bottom portion 102 of the housing 100 encloses the turbine generator 200. The inner geometry of the housing 100, enclosing the turbine generator 200, has a substantially cylindrical geometry. The bottom portion 102 of the housing 100 has first 103 and second 104 flow ends, and is substantially cylindrical in shape, that is, it has a cylindrical geometry between the flow ends 103, 104. Flow ends 103, 104 refer to the ends of the housing 100 where fluid enters or leaves the housing 100. The flow ends 103, 104 are aligned with the turbine generator 200. Fluid flowing through the housing 100 and the turbine generator 200 has a substantially linear flow path. The housing 100 has a length, wherein the length of the housing refers to the distance from the first flow end 103 to the second flow end 104. The circular cross section of the bottom portion 102 of the housing 100 is perpendicular to the flow of fluid through the turbine generator 200. Fluid flowing through the housing 100 may flow from the first flow end 103 to the second flow end 104, or from the second flow end 104 to the first flow end 103, depending on the direction of fluid flow. This arrangement of turbine generator assembly 1 is commonly known as an axial flow turbine.

As can be seen in FIG. 1B the housing 100 has furthermore, a substantially cylindrical geometry, along the transverse axis T (where the T axis is in to the page).

The housing 100 has a substantially circular cross section along the longitudinal L axis, and transverse T axis. The transverse axis T of the housing 100 is perpendicular to both the direction of flow and the lateral axis A of the housing. This substantially circular cross-section allows the turbine assembly 1 to be positioned within a pipe with a circular cross-section perpendicular to the flow of fluid. This is especially ideal where the turbine assembly 1 is to be mounted to an existing pipe or pipe section. An existing section of pipe may be difficult to access and a turbine assembly 1 having a circular cross-section can be efficiently installed in to a bore in to the existing pipe. Due to its cylindrical geometry along the transverse axis T, the turbine assembly 1 is receivable in a cylindrical bore. The cylindrical geometry of the housing 100 along the transverse axis T leads to improved sealing of the turbine assembly 1 within the circular bore compared to another geometry. For example, standard circular seals or gaskets may be used to seal the turbine assembly 1 within a pipe, furthermore, pipe sections do not need to removed to house the turbine, that is the turbine assembly 1 may simply be inserted through the bore and then sealed at the pipe wall.

The housing 100 of the turbine assembly 1 is adapted to direct fluid in to the plurality of blades 201. As described above, the housing 100 has a substantially cylindrical form where the cylinder is arranged substantially in alignment with the direction of fluid flow. The first 103 or second 104 flow end of the housing 100 has an outer edge 105 which may have a circular or elliptical geometry. The first 103 or second 104 flow end of the housing has an inner edge 106, defining an inner wall 107. The inner edge 106 generally has a circular geometry, the radius of the inner edge 106 is less than the radius of the outer edge 105. That is, the flow end has a partial conical profile. If the outer edge 105 of the flow end is circular and the inner edge 106 is circular then the profile of the flow end may be described as an even frustum having a circular base. If the outer edge 105 of the flow is elliptical then the profile of the flow end may be described as a frustum with an elliptical base. An elliptical outer edge 105 for the flow end has the advantage that a greater portion of the surface area of the housing directs fluid towards the turbine. When provided with an elliptical profiled edge 105, the ellipsis has its longitudinal extension (its longer axis) in line with the transverse axis T of the housing 100.

The inner wall 107 of the housing 100 is the wall which fluid flows past as it passes through the turbine generator 200. As stated previously, the inner wall 107 is generally at least partially cylindrical. As can be seen in FIG. 2b the inner profile of the housing 100 may be two opposed frustums connected by a central cylindrical portion.

Figure 2A:
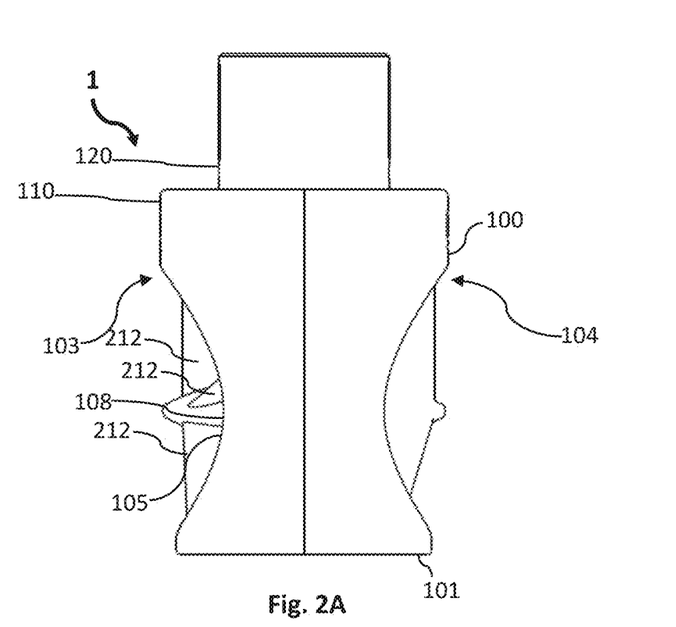
FIG. 2A is a perspective view of a turbine generator assembly according to an aspect.
Figure 2B:
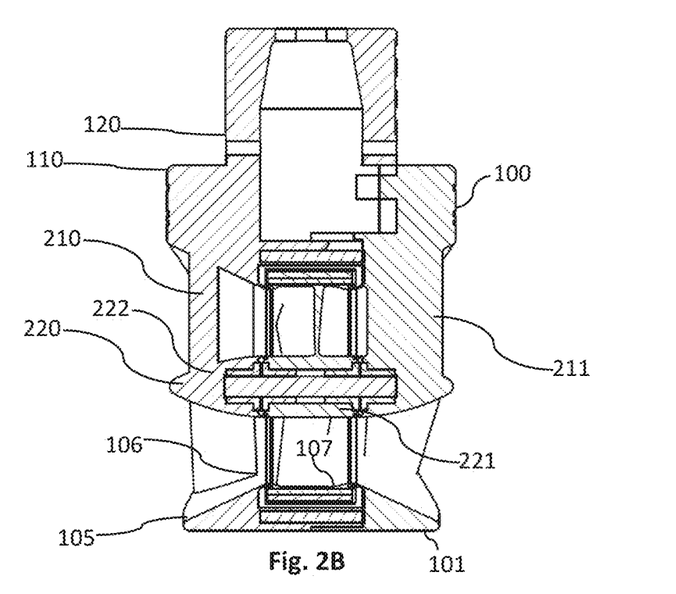
FIG. 2B is a cross-sectional perspective view of a turbine generator assembly according to an aspect.

As shown in FIG. 2a, the first 103 and/or second 104 flow ends of the housing 100 may be provided with a pair of concave recesses 108. The housing 100 is therein provided with two regions of reduced length relative to the total length of the housing 100. The concave recesses 108 may be provided at lateral regions of the housing 100. The length of the housing 100 at the lateral regions are thus of reduced length relative to the total length of the housing 100. The concave recesses 108 are generally opposed such that each is at a lateral region of the housing 100. The concave recess 108 create an increased area for fluid to enter the turbine generator 200 within the cylindrical transverse geometry. The concave recess 108 may furthermore improve fluid flow and limit disruption of fluid flowing past the housing 100 and fluid flowing in to the turbine generator 200. This is important in cases where fluid flow and water pressure should not be greatly impacted by the turbine.

Both the first 103 and second 104 flow ends of the housing 100 may be provided with a pair of recesses 108. In such an arrangement the length of the housing in the lateral regions is substantially less than the maximum length of the housing 100. The recesses 108 in the second flow end 104 lead to a similar area for fluid to leave the turbine generator 200 as is provided for fluid to enter the turbine generator 200, thus improving fluid flow.

Specifically, the recesses 108 are formed by the outer edge 105 of the housing 100 being provided with a concave curvature. The concave curved edges extend from an upper region 110 of the housing 100 to a lower region 102. The concave recesses 108 form a curved and partially conical geometry for directing fluid towards the turbine generator 200. The concave recess 108 form a partially conical geometry extending from the outer wall 101 of the housing to the inner wall 107 of the housing 100.

The turbine generator 200 comprises a central axis around which the plurality of blades 201 rotate. The central axis is aligned with the longitudinal axis L of the turbine generator 200. At the periphery of the blades 201 a rotor 202 comprising at least one magnet is provided. The rotor 202 is annular to the blades 201, the central axis, and is generally fixed to at least one of the plurality of blades 201. The rotor 202 may be fixed to all of the plurality of blades 201 for improved rigidity. The rotor is fixed to the blade(s) 201 at an radial outer portion of the blade(s) 201. The blades are fixed to a central portion of the turbine generator 200 which can rotate. As the blades 201 rotate with respect to the housing 100, the rotor 202 also rotates with respect to the housing 100. The turbine generator 200 generates an electrical current via the flow of fluid past the turbine blades 201 and the interaction of the rotor 202 with the stator 300.

Generally, in the present turbine assembly 1, the rotor 202 comprises a plurality of permanent magnets. The plurality of magnets has an alternating arrangement of north and south poles being directed towards the stator 300, that is, radially outwards.

Figure 3:
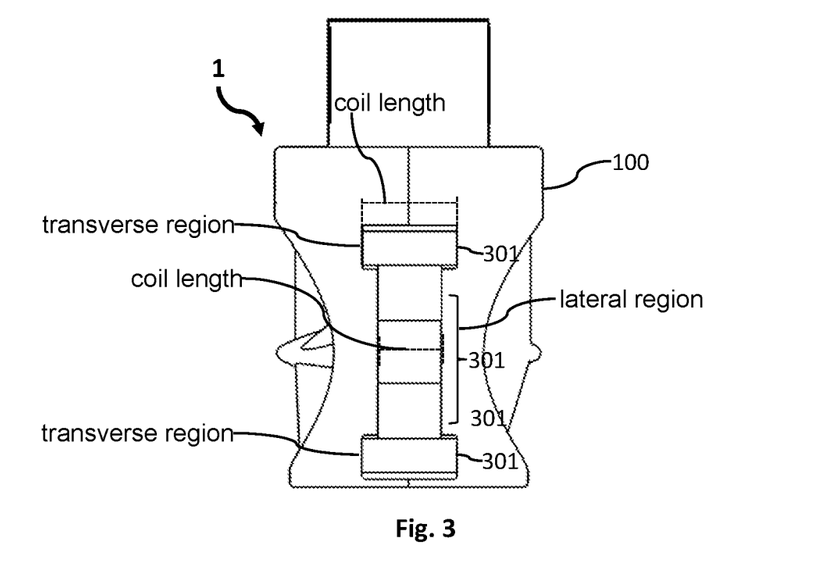
FIG. 3 is a perspective view of a turbine generator assembly according to an aspect where a segmented stator is highlighted.
Figure 4A:
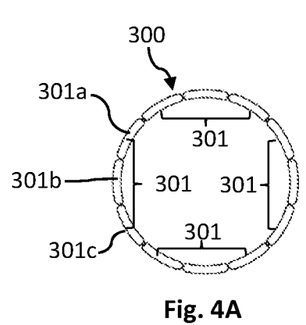
FIG. 4A-C are perspective views of a segmented stator according to an aspect.
Figure 4B:
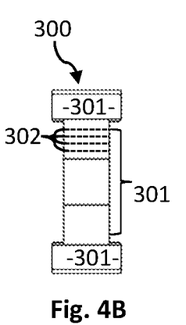
Figure 4C:
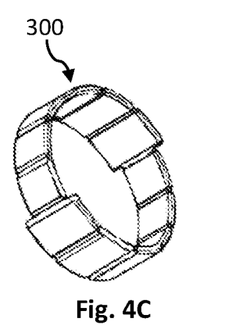

As shown in FIGS. 3 and 4, the stator 300 is provided within the housing 100. The stator 300 is in fixed relationship with the housing 100. The stator 300 does not rotate with respect to the housing 100. The stator 300 is arranged annularly and peripherally to the rotor 202, and the plurality of blades 201.

To increase the energy generated by a turbine the magnetic field induced between the stator and the rotor may be increased. Typically this is achieved by using an iron core in the stator. However, this increases the magnetic braking torque over the turbine and leads to a greater pressure drop of the fluid flowing through the turbine. Another technique for increasing the energy generated in a turbine is to increase the speed of rotation of the turbine. This may be achieved by creating a conical geometry in the housing to increase the flow rate of water as it reaches the turbine blades. Both of these solutions lead to increased pressure drop of the fluid over the turbine. Such an increase in pressure drop of the fluid through the turbine is not suitable in a turbine adapted for generating electricity and adapted to not significantly disrupting the flow of fluid. For example, in the case when the velocity of the fluid should also be measured by the turbine, increasing the pressure drop would lead to inaccurate flow rate measurement. The present turbine assembly 1 is intended to be positioned in systems where the pressure drop over the turbine should not be high, such as communal water systems. The present stator 300 comprises an air core, it does not comprise a ferrous, such as iron, core.

Another technique for increasing the energy generated by the turbine is to increase the swept area between the stator and the rotor. For example, by increasing the radius of the stator and/or rotor, or by increasing the total length of the stator and/or rotor. The above described geometry of the housing 100 leads to a limitation on the radius and length of the stator 300 and rotor 202. The radius cannot be generally increased as this would increase the outer geometry of the housing 100 and lead to a limitation in potential application areas and increases in water disruption past the turbine generator 200.

The stator 300 comprises at least one segmented winding. The winding is divided in to a plurality of segments 301. Each segment 301 of the winding comprises a plurality of individual winds 302 (represented by the dotted line in FIG. 4b). Each of the segments 301 may comprise at least one coil, that is a plurality of interconnected winds 302. Each of the winds 302 of the coils are substantially parallel with the longitudinal axis L of the turbine generator 200, and the direction of fluid flow through the turbine assembly 1. Each of the segments 301 has a length which is measured in line with the longitudinal axis of the turbine generator 200. The length of each of the segments 301 is defined by the length of the individual winds 302 of the coil(s). The length of the plurality of winds 302 of the coil are substantially the same within a segment 301. The length of the segments 301 described herein is referred to as the coil length.

The present turbine assembly 1 has a segmented stator 300 wherein the stator 300 comprises a plurality of segments 301. The plurality of segments 301 are generally spaced equally around the circumference of the stator 300. At least a first and second segment have different coil lengths and/or thicknesses. This enables the stator 300 to increase the swept area where possible within the cylindrical geometry, but does not impact the overall geometry of the assembly 1. The increase in swept area leads to an increase in energy generation in the turbine generator 200. As opposed to increases in the overall diameter of the stator/rotor, the transverse cylindrical geometry of the turbine generator 200 is not altered with such a segmented design.

A first segment 301 of the stator 300 has a first coil length. A second segment 301 of the stator 300 has a second coil length, which is greater than the coil length of the first segment 301. The segmentation of the stator 300 may be achieved by segmenting at least one winding. At least one winding is separated in to segments 301, wherein at least a first and a second segment of the winding have a different coil length, and/or a different coil thickness.

As described above, the length of the winds 302, coils, and therein the length of the segments 301, the coil length, is measured with respect to the longitudinal axis L of the turbine generator 200. The thickness of the segments 301, and therein the thickness of the winds 302, the coil thickness, is measured radially. The thickness of the segments 301 is the radial thickness of the winds 302 with respect to the circular cross-section of the stator 302. The width of the segments 301, that is, the arc which they define in the annular stator 300 is generally equal for all segments 301 in the plurality of segments 301. However, in some instances they may not be equal. The segment 301 or segments 301 present in the lateral regions of the stator 300, those corresponding to the lateral regions of the turbine housing 100, may be shorter than the segment 301 or segments 301 present in the transverse regions of the stator 300, those corresponding to the transverse regions of the turbine housing 100. The transverse regions of the stator 300, corresponding to the transverse regions of the turbine housing 100, are longer than the lateral regions of the stator 300, those corresponding to the lateral regions of the turbine housing 100. The length of the stator 300 refers to the longitudinal length of the stator 300, measured in line with the longitudinal axis L of the turbine generator 200, turbine assembly 1, and housing 100.

The stator 300 may comprise four segments 301 spaced equally around the circumference of the stator 300. Each segment 301 may form about a quarter turn, corresponding to an arc of about 90°, of the stator 300. Two of the four segments 301 may be shorter, that is, have windings 302 of shorter coil length, compared to the remaining two segments 301. As described above, the shorter segments 301 may be arranged at the lateral regions of the stator 300. The longer segments 301 may be arranged at the transverse regions of the stator 300. The stator 300 may have an equal number of short and long segments 301.

Each segment 301 of the stator may have a coil length of from about 3 mm to about 200 mm. The shorter segments 301 may have a coil length of from about 3 mm to about 150 mm, such as from about 6 mm to about 10 mm such as about 8 mm, or from about 15 mm to about 30 mm, such as about 20 mm. The longer segments 301 may have a coil length of from about 10 mm to about 200 mm, such as from about 5 mm to about 20 mm, such as about 16 m, or from about 20 mm to about 50 mm such as about 30 mm.

As shown in FIGS. 3 and 4, a three phase turbine generator 1 may comprise a plurality of windings and a plurality of segments 301 which may be considered segment triplets 301. A segment triplet 301 refers to a segment of a stator comprising three separate portions 301a, 301b, 301c of each of the plurality of windings. Within the segment triplet 301 the three separate portions 301a, 301b, 301c of windings are adjacent each other. Each of the portions 301a, 301b, 301c may be a coil. Each of the wound portions 301a, 301b, 301c, or coils, correspond to a phase of the three phase generator. Each of the portions 301a, 301b, 301c of the wound coil comprised in a segment triplet 301 have the same coil length. The segment triplet 301 may in some instances comprise more than three portions, such as six, nine or another multiple of three.

As stated, each of the portions 301a, 301b, 301c of the of the segment triplets 301 may correspond to a phase. For example, the first portion 301a of the triplet may correspond to phase P1, the second portion 301b may correspond to phase P2, the third portion 301c may correspond to phase P3. Whilst it may, each portion of the triplet need not correspond to a different phase. For example, the triplet 301 may comprise a portion 301a corresponding to a first phase, and two portions 301b, 301c, each corresponding to a second phase. As described above, the stator 300 may comprise four segment triplets 301 spaced equally around the stator. Each of the segment triplets 301 may be arranged at about 90° from the preceding segment triplet 301. Each of the three portions 301a, 301b, 301c of the segment triplet 301 may be arranged at about 90° from their preceding and corresponding portion 301a, 301b, 301c of the preceding segment triplet 301. In a three phase turbine generator 1 the sequence of segments 301 may therefore be have a sequence which can be defined as $(P1\ P2\ P3)_S-(P1\ P2\ P3)_L-(P1\ P2\ P3)_S-(P1\ P2\ P3)_L$ where $_S$ refers to a segment triplet 301 of reduced coil length and $_L$ refers to a segment triplet of coil length longer than the shorter coil length. As each segment triplet 301 defines an arc of about 90°, and each segment triplet comprises 3 portions, each portion of the segment triplet 301 defines an arc of about 30°. The sequence described above may start at one of the lateral regions of the stator 300. The first segment triplet 301 having a shorter coil length is thus arranged at one of the lateral regions of the stator 300. The second segment triplet 301, corresponding to the longer coil length portions/coils, is arranged at one of the transverse regions of the stator 300. The third segment triplet 301, having portions/coils of a shorter coil length, is arranged at the opposite lateral region of the stator 300 from the first lateral segment triplet 301. The fourth segment triplet 301, having portions/coils of a longer coil length is arranged at the opposite transverse region of the stator 300 to the first transverse stator segment 301.

As described below, the thickness of the segments 301 may be uniform for all segments 301, or may be different. The stator 300 may comprise stator segments 301 having different thicknesses. For example, the stator 300 may comprise lateral segments 301 which are substantially thicker than the transverse segments 301. The stator 300 may comprise transverse segments 301 which are substantially thicker than the lateral segments 301. The segments 301 which have a greater thickness may also have a greater coil length than the thinner segments 301. The stator 300 may have an equal number of thick segments 301 and thinner segments 301. The thickness of the segments 301 of the stator 300 affects the power which can be generated by the segments, and therein the turbine generator. The power generated from a thicker segment 301 is increased compared to a thinner segment.

The thickness of the segments 301 may be from about 1 mm to about 10 mm, such as about 3 mm.

The wire thickness for the wire in each coil may be greater than about 0.05 mm, such as from about 0.1 mm to about 0.25 mm. Each segment comprises a plurality of windings. Each segment may comprise more than 100 windings, such as 300 to 600 windings. The segments having longer coil lengths may comprise more windings than the segments of shorter coil length.

The turbine generator 200 may be fixed in position within the housing 100 by first 210 and/or second 211 supports. Each of the supports 210, 211 may be fixed at a first end to the housing 100, and at a second end to a tapered longitudinal hub 220 substantially enclosing the central rotational axis of the turbine generator 200. The supports 210, 211 may have a transverse arrangement with respect to the housing 100. The supports may be provided with a tapered profile such that flow disruption past the supports 210, 211 and in to the turbine generator 200 is limited. The taper of the longitudinal hub 220 reduces water disruption through the turbine. The turbine generator 200 may be provided with a plurality of fixed vanes 212 which tend to induce rotation in the flow of fluid before the fluid reaches the blades of the turbine. The vanes extend radially from the centre of the turbine, at the hub 220, to the housing 100.

One of the vanes 212 may form the first support 210 to simplify the design of the turbine assembly 1.

The longitudinal hub 220 may comprise a portion 221 which is rotatable around the longitudinal axis of the hub 220, and a portion which is fixed 222. The fixed portion 222 is generally in attachment to the first and/or second supports 210, 211. The rotatable portion 221 is rotatable with respect to the fixed portion 222. The blades of the turbine are provided in connection to the rotatable portion 222 of the hub 220.

The housing 100 may comprise an upper portion 110, distal to the turbine generator 200, which comprises a transverse cylindrical projection 120. The cylindrical projection 120 may be threaded such that it can be screwed in to position on a threaded sleeve. The threaded sleeve would in such cases help to hold the turbine assembly 1 in position. The cylindrical projection may comprise a transverse aperture such that wiring etc. for connection to the turbine generator 200 may extend through the aperture.

The present turbine assembly 1 is intended to efficiently generate power in micro-hydro environments. It is therein intended to be installed in pipes of limited diameter, such as those found in communal water systems within a city. These systems may be referred to as micro-hydro systems, as opposed to hydroelectric systems for bulk electricity generation. The present turbine assembly 1 is not intended to be installed in to large diameter hydroelectric systems for bulk electricity generation. As opposed to general hydro or micro-hydro systems non-disturbance of the flow and maintaining as low pressure drop as possible over the turbine is necessary.

The above intended application areas means that the geometry of the turbine assembly 1 is restricted by e.g. the diameter of existing intracity pipe infrastructure. The diameter of the bore in to which the turbine can be positioned, and therefore the diameter of the turbine assembly 1 along the transversal axis, may be from about 20 mm to about 500 mm, such as from about 50 mm to about 100 mm. The diameter of the stator may be from about 20 mm to about 500 mm, such as from about 30 mm to about 100 mm, or from about 40 mm to about 70 mm.

Figure 5:
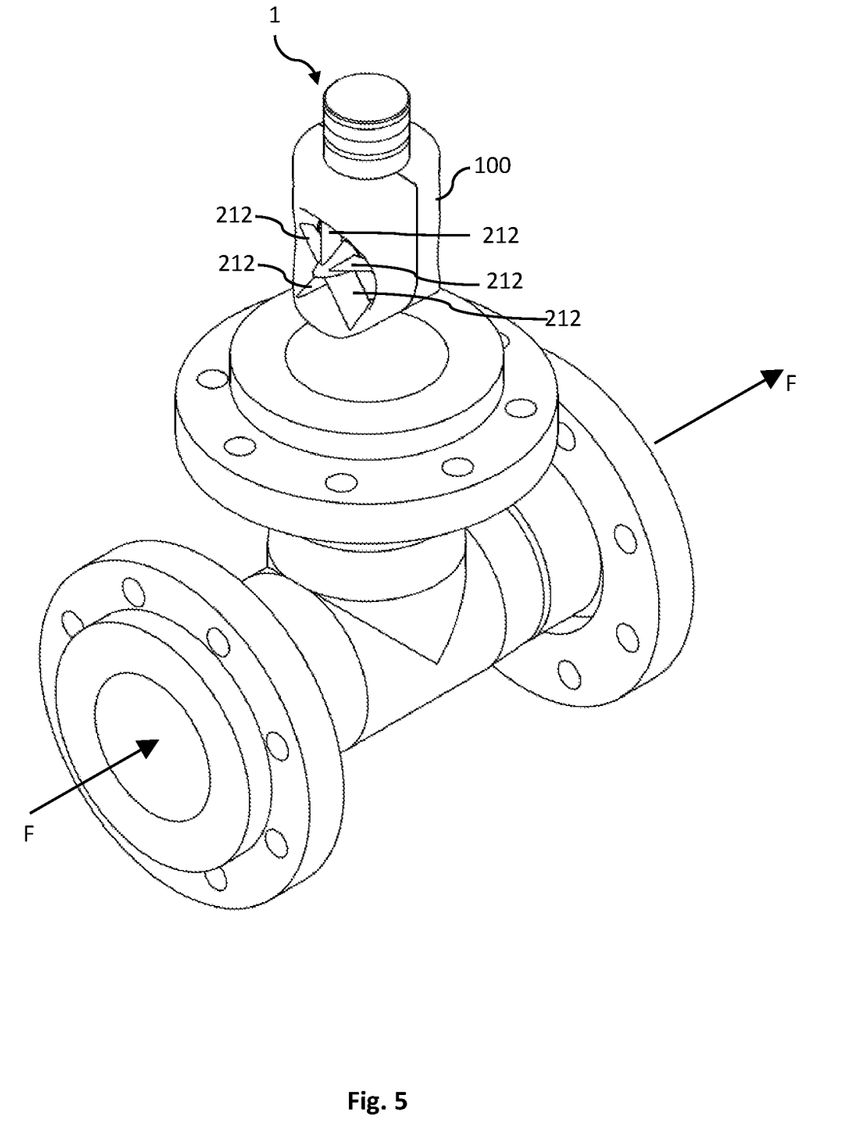
FIG. 5 is a perspective view of a turbine generator assembly aligned and receivable within a perpendicular bore of a pipe section.
Figure 6:
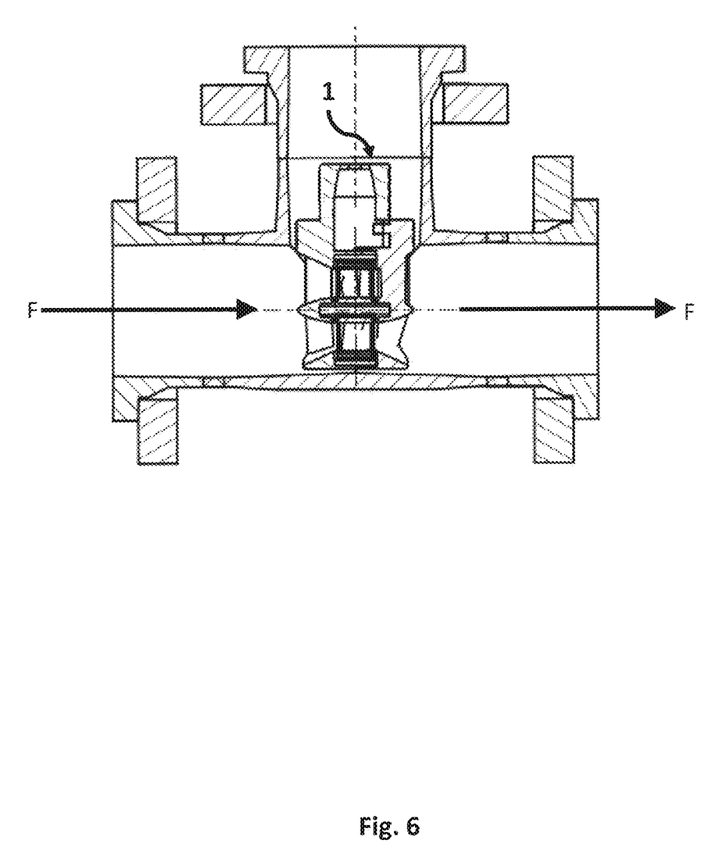
FIG. 6 is a cross-sectional perspective view of a turbine generator assembly in a pipe section.

FIGS. 5 and 6 show the turbine generator assembly 1 in position in a section of a pipe. The arrow F shows the general direction of fluid flow. It can be seen that the turbine generator assembly 1 is receivable in the cylindrical bore provided in the upper portion of the longitudinal pipe member comprising the fluid flow.

The turbine generator assembly 1 may be provided with a means of measuring the speed of rotation of the blades 201 of the turbine generator 200. The speed of rotation of the blades 201 is dependent on the velocity of fluid flow through the turbine generator 200. Therein, the turbine generator assembly 1 may measure the speed of flow of fluid through the turbine assembly 1 via the speed of rotation of the blades 201.

The turbine generator assembly 1 is ideally suited to use to power sensing and measuring devices provided in the vicinity of pipes for the distribution of water. As power can be generated in situ without the need for replacement of batteries and without needing to access mains electricity then the turbine generator assembly 1 may power devices for an extended duration without external intervention.

In some instances the turbine generator assembly described herein may be provided with a stator having segments of uniform coil length and/or thickness. That is, a traditional uniform stator. As was shown and described above the power generated from such a turbine assembly would be reduced in comparison to the segmented stator 300 having at least two segments 301 provided with different coil lengths and/or thicknesses. Independent of the stator design, a turbine generator having a housing provided with a cylindrical geometry remains advantageous in that it can effectively be positioned and seal through a circular bore or aperture.

The housing 100 may be manufactured from a variety of substantially rigid materials such as metals or plastics. The housing 100 may comprise two separate substantially semi-cylindrical members which are fixed together along their transverse axes to form the cylindrical housing 100.

Experimental Section

Comparison Between Stators Having Segments of Uniform Length and a Stator According to an Aspect Having a Non-Uniform Segment Length A three phase stator 300 was built which was split in four segments 301, every segment 301 corresponds to one quarter of a full turn of the stator. A segment 301 consisted of three coils, one for every phase. The first segment 301 comprised three short coils, the second segment 301 comprised three long coils, the third segment 301 comprised three short coils, and the fourth segment 301 three long coils.

A copper wire with diameter 0.20 mm was wound to 6 coils each of dimension 20×20×3 mm, and each coil consisting of about 440 turns or windings, the wire was further wound to 6 longer coils, each of dimension 27×20×3 mm and each consisting of about 530 turns or windings. The internal resistance of the coils having a shorter length was about 11.6 ohms. The internal resistance of the coils having a longer length was about 16.8 ohms. These coils where assembled to a three phase stator 300 with diameter 76 mm. The stator 300 was built using the pattern $(P1\ P2\ P3)_S–(P1\ P2\ P3)_L–(P1\ P2\ P3)_S–(P1\ P2\ P3)_L$ and each phase had a resistance of 56.8 about ohms.

In the experiment the stator 300 was compared to a reference stator with same diameter and pattern of coils was used, but built traditionally with same lengths for all coils. The coils in the reference stator all had the size 20×20×3 mm and consisted of 440 turns and phase resistance of about 46.4 ohm.

These two stators where tested at a constant rotational speed of 240 rpm. The rotor comprised 16 permanent neodymium magnets of size 25×6×2 mm and grade 45 SH, mounted evenly distributed on a steel ring of size L=25, DI=60.5, DY=63.5 mm. The magnets are assembled on the steel ring so every other faces the steel with north pole and every other faces with south pole.

The induced phase voltage showed to be about 67% higher for the stator 300 using described technology compared to the reference stator.

Comparison Between Power Out with External Load Present

The stator 300 and the reference stator were also tested with an external load at the speed of 240 rpm. The load was chosen to be close to respectively stator's internal phase-to-phase resistance, therefore a load of 120 ohm respectively 68 ohm was chosen. The generated power from the stator 300 having segments 301 of coils with longer lengths, and segments 301 of coils with shorter lengths was about 40% higher than the reference stator at the same speed.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A turbine generator assembly for generating power from a fluid flow, the assembly comprising:
    a housing for directing the fluid flow in a direction,
    a turbine generator having a longitudinal axis (L) of extension parallel to the direction of the fluid flow through the housing, the turbine generator being enclosed in said housing, said turbine generator comprising:
        a plurality of blades provided on a central rotational axis being parallel with the longitudinal axis (L),
        a rotor, and
        a stator arranged peripherally and exterior to the rotor,
    wherein at least one of the plurality of blades is provided in fixed arrangement with the rotor,
    wherein the stator of the turbine generator comprises a plurality of stator segments each having a coil length parallel to the longitudinal axis (L) of the turbine generator,
    wherein the turbine generator comprises an axial flow turbine,
    wherein the direction of fluid flow is parallel to the central rotational axis of the turbine generator, the axial flow turbine having a transversal axis (T) perpendicular to the longitudinal axis (L), the transversal axis (T) extending from a bottom portion of the housing to a top portion of the housing,
    wherein the housing comprises a cylindrical body extending along the transversal axis (T), the cylindrical body being receivable in a cylindrical bore,
    wherein the plurality of stator segments comprises at least one first stator segment having a first coil length and at least one second stator segment having a second coil length, said second coil length being longer, in a direction of the longitudinal axis (L), than said first coil length.

2. The turbine generator assembly according to claim 1, wherein the housing comprises an outer wall positioned at a bottom portion of the housing, the outer wall having a cylindrical shape extending along the longitudinal axis (L).

3. The turbine generator assembly according to claim 1, wherein the plurality of stator segments forming the stator comprises an equal number of segments of the first coil length and segments of the second coil length.

4. The turbine generator assembly according to claim 1, wherein the stator comprises an air core.

5. The turbine generator assembly according to claim 1, wherein the turbine generator further comprises a three phase generator, and wherein each segment of the plurality of stator segments comprises at least three coils, each of the at least three coils corresponding to an electrical phase, and all coils within a segment having a same coil length.

6. The turbine generator assembly according to claim 1, wherein the rotor comprises a plurality of permanent magnets.

7. A pipe assembly comprising the turbine generator assembly according to claim 1, wherein the cylindrical bore is a cylindrical bore of the pipe assembly, and the housing of the turbine generator assembly is receivable in the cylindrical bore of the pipe assembly.

8. The turbine generator assembly according to claim 1, wherein:
   the housing has a first flow end comprising a pair of laterally opposed concave recesses, and
   the laterally opposed concave recesses each comprise a partially conical geometry for directing fluid towards the turbine generator.

* * * * *